(12) United States Patent
Cox (10) Patent No.: US 9,883,246 B2
(45) Date of Patent: Jan. 30, 2018

(54) NEWS PRODUCTION SYSTEM WITH DYNAMIC CHARACTER GENERATOR OUTPUT

(71) Applicant: Tribune Broadcasting Company, LLC, Chicago, IL (US)

(72) Inventor: Gary Wilson Cox, Sacramento, CA (US)

(73) Assignee: Tribune Broadcasting Company, LLC, Chicago, IL (US)

(*) Notice: Subject to any disclaimer, the term of this patent is extended or adjusted under 35 U.S.C. 154(b) by 140 days.

(21) Appl. No.: 14/809,673

(22) Filed: Jul. 27, 2015

(65) Prior Publication Data

US 2017/0034582 A1  Feb. 2, 2017

(51) Int. Cl.
*H04N 5/445* (2011.01)
*H04N 21/475* (2011.01)
*H04N 21/237* (2011.01)
*H04N 21/236* (2011.01)
*H04N 21/262* (2011.01)
*G06Q 10/10* (2012.01)
(Continued)

(52) U.S. Cl.
CPC ........ *H04N 21/4758* (2013.01); *G06Q 10/10* (2013.01); *G06Q 50/26* (2013.01); *H04N 21/237* (2013.01); *H04N 21/23614* (2013.01); *H04N 21/262* (2013.01); *H04N 21/854* (2013.01)

(58) Field of Classification Search
None
See application file for complete search history.

(56) References Cited

U.S. PATENT DOCUMENTS 6,460,018 B1 *  10/2002  Kasai ............... G06Q 10/06314
                                                      348/155
6,941,515 B1 *   9/2005  Wilkins ................. G06T 11/60
                                                      715/717
(Continued)

FOREIGN PATENT DOCUMENTS

JP   2005333279 A   12/2005
JP   2006107125 A    4/2006
(Continued)

OTHER PUBLICATIONS

The International Search Report (ISR) with Written Opinion of the International Searching Authority for PCT/US2016/043567, dated Nov. 2, 2016.

(Continued)

*Primary Examiner* — James R Sheleheda
(74) *Attorney, Agent, or Firm* — McDonnell Boehnen Hulbert & Berghoff LLP (57) ABSTRACT

In one aspect, an example method involves: accessing, by a computing device, data associated with an election; using, by a computing device, the accessed data to determine a status associated with a voting option of the election; using, by the computing device, the determined status as a basis to select a content storage-location from among multiple content storage-locations, wherein each of the multiple content storage-locations corresponds with a respective content placeholder of a content template; and storing, by the computing device, in the selected content storage-location, (i) a content item associated with the voting option or (ii) a reference to the content item.

18 Claims, 8 Drawing Sheets

(51) Int. Cl.
    *G06Q 50/26*     (2012.01)
    *H04N 21/854*     (2011.01)

(56) References Cited

U.S. PATENT DOCUMENTS

| | | | |
|---|---|---|---|
| 7,835,920 B2* | 11/2010 | Snyder | G06F 3/0481 |
| | | | 705/1.1 |
| 9,049,386 B1* | 6/2015 | Hundemer | H04N 21/23412 |
| 9,264,752 B1* | 2/2016 | Hundemer | H04N 21/26258 |
| 9,674,464 B2* | 6/2017 | Cox | H04N 5/272 |
| 2004/0008220 A1* | 1/2004 | Snyder | G06F 3/0481 |
| | | | 715/716 |
| 2007/0242082 A1* | 10/2007 | Lathrop | G06F 17/30271 |
| | | | 345/619 |
| 2012/0291067 A1* | 11/2012 | Wiles | H04H 60/06 |
| | | | 725/35 |
| 2016/0232878 A1* | 8/2016 | Chen | G09G 5/14 |
| 2016/0253329 A1* | 9/2016 | Uretzky | G06Q 50/01 |
| | | | 707/723 |
| 2017/0034452 A1* | 2/2017 | Cox | H04N 5/272 |

FOREIGN PATENT DOCUMENTS

| | | |
|---|---|---|
| JP | 2012038041 A | 2/2012 |
| KR | 1020040080224 A | 9/2004 |
| KR | 201330039340 A | 4/2013 |
| KR | 1020130039340 | 4/2013 |

OTHER PUBLICATIONS

International Written Opinion dated Nov. 2, 2016 issued in connection with International Application No. PCT/US2016/043567 filed Jul. 22, 2016, 7 pages.

* cited by examiner

NEWS PRODUCTION SYSTEM WITH DYNAMIC CHARACTER GENERATOR OUTPUT

USAGE AND TERMINOLOGY

In this disclosure, with respect to all reasonable derivatives of such terms, unless otherwise specified and/or unless the particular context clearly dictates otherwise, each usage of "a" or "an" means at least one, and each usage of "the" means the at least one.

BACKGROUND

Unless otherwise specified, the materials described in this section are not prior art to the claims in this disclosure and are not admitted to be prior art by inclusion in this section.

A news production system (NPS) may generate and output a video stream representing a news program. The NPS may include various components to aid in the process of generating and outputting the video stream. For example, the NPS may include a scheduling system, which may provide a user interface that allows a user (e.g., a producer or technical director) to create and/or edit a program schedule of the news program. The scheduling system may then process records in the program schedule, and based on the processed records, control one or more devices, systems, or other entities of the NPS to facilitate generating and outputting the video stream.

The NPS may also include a character generator, which may use a set of content items to generate a video stream representing video content that includes the content items.

SUMMARY

In a first aspect, an example method includes: accessing, by a computing device, data associated with an election; using, by a computing device, the accessed data to determine a status associated with a voting option of the election; using, by the computing device, the determined status as a basis to select a content storage-location from among multiple content storage-locations, wherein each of the multiple content storage-locations corresponds with a respective content placeholder of a content template; and storing, by the computing device, in the selected content storage-location, (i) a content item associated with the voting option or (ii) a reference to the content item.

In a second aspect, an example non-transitory computer-readable medium has stored thereon, program instructions that when executed by a processor, cause the computing device to perform a set of acts including: accessing data associated with an election; using the accessed data to determine a status associated with a voting option of the election; using the determined status as a basis to select a content storage-location from among multiple content storage-locations, wherein each of the multiple content storage-locations corresponds with a respective content placeholder of a content template; and storing in the selected content storage-location, (i) a content item associated with the voting option or (ii) a reference to the content item.

In a third aspect, an example system includes a data storage unit including multiple content storage-locations, wherein each of the multiple content storage-locations corresponds with a respective content placeholder of a content template, and wherein the system is configured to perform a set of acts including: accessing data associated with an election; using the accessed data to determine a status associated with a voting option of the election; using the determined status as a basis to select a content storage-location from among the multiple content storage-locations; and storing in the selected content storage-location, (i) a content item associated with the voting option or (ii) a reference to the content item.

DETAILED DESCRIPTION

I. Overview

As noted above, a character generator may use a set of content items to generate a video stream representing video content that includes the content items. In one example, through a user interface of the character generator, a user may specify an arrangement of the content items. The character generator may then use the set of content items and corresponding arrangement information, to generate a video stream representing video content that includes the content items in the specified arrangement.

In a scenario where an NPS produces a news program that provides coverage of an election, the content items may relate to various voting options of the election. For example, where the election involves a process where voters vote to determine which of a first candidate and a second candidate obtains a political office, a first content item may be text indicating a name of the first candidate, and a second content item may be text indicating an amount of votes tabulated for the first candidate (perhaps expressed as a percentage of all voted tabulated). Similarly, a third content item may be text indicating a name of the second candidate, and a fourth content item may be text indicating an amount of votes tabulated for the second candidate.

Through the user interface of the character generator, the user may arrange the content items by grouping the first and second content items into a first group, grouping the third and fourth content items into a second group, and positioning the first group above the second group. Thus, in the video content represented by the video stream, the content items corresponding to the first candidate may be above the content items corresponding to the second candidate.

In some instances though, it may be desired to modify the video stream generated by the character generator during production of the news program. For example, where the second candidate overtakes the first candidate in an amount of tabulated votes, it may be desired to modify the video stream such that the content items corresponding to the second candidate are above the content items corresponding to the first candidate.

The present disclosure provides an NPS that helps address this issue. In one aspect, the NPS includes an election system in addition to a character generator. The election system collects and organizes various types of election-related data.

The election system may access data associated with an election, and may use the accessed data to determine a status associated with a voting option of the election. In one example, the election may be an election for a political office, and the voting option may be a candidate for the political office. The status may be a ranking of the voting option based, at least in part, on a comparison between an amount of votes tabulated for the voting option and an amount of voted tabulated for another voting option of the election.

Next, the election system may use the determined status as a basis to select a content storage-location from among multiple content storage-locations, where each of the multiple content storage-locations corresponds with a respective content placeholder of a content template. The content storage-locations may be part of a data storage unit included in the election system, a video source (e.g., a character generator), or another device. The election system may then store, in the selected content storage-location, a content item associated with the voting option. A video source (e.g., a character generator) may then use the stored content item to generate a video stream representing video content that includes the stored content item positioned based on a position of the content placeholder. In another example, the election system may store, in the selected content storage-location, a reference (e.g., a link in the form of a URL or file path, or a reference code, such as a Boolean value) to the content item. In this case, the video source may use the reference to retrieve the content item, and then use the retrieved content item to generate the video stream.

To illustrate how this technique may be applied in practice, consider a content template having a first group of content placeholders positioned above a second group of content placeholders. In the case where a first candidate is leading over a second candidate in an election, the election system may store content items associated with the first candidate in content storage-locations that correspond to the placeholders of the first group. Similarly, the election system may store content items associated with the second candidate in content storage-locations that correspond to the placeholders of the second group. However, if the second candidate then takes a lead over the first candidate, the election system may store content items associated with the second candidate in the content storage-locations that correspond to the placeholders of the first group (i.e., replacing the previously stored content). Similarly, the election system may store content items associated with the first candidate in the content storage-locations that correspond to the placeholders of the second group.

This may result in the content items corresponding to the first candidate and the second candidate being flipped within the video content. From the perspective of a viewer, this may be more desirable since the content items associated with the leading candidate may be in a more prominent position than the content items associated with the second place candidate.

II. Example Devices and Systems

Figure 1:
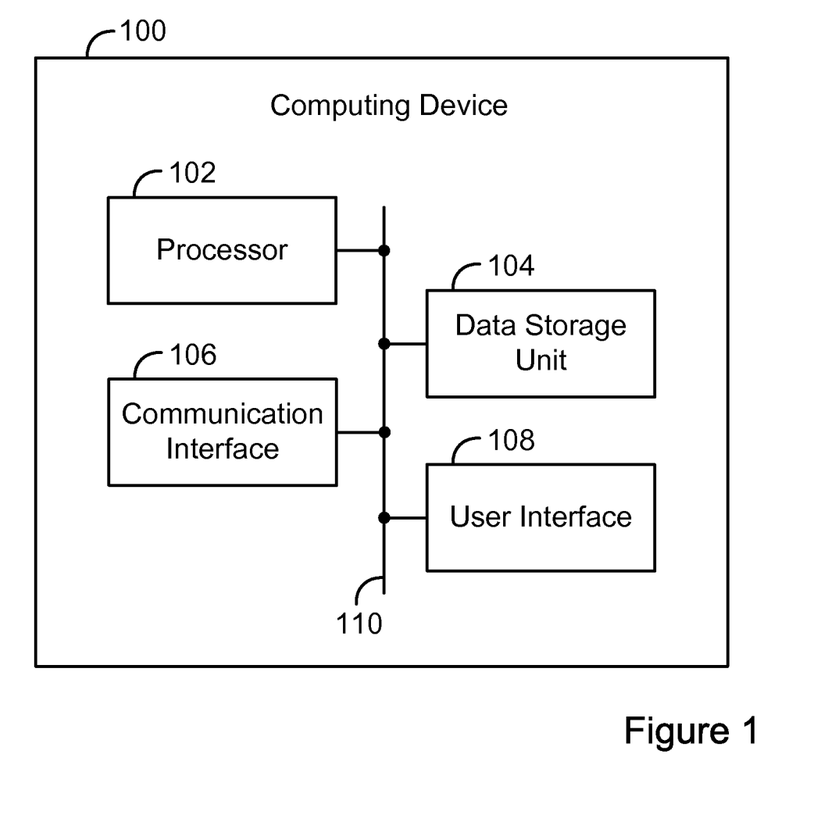
FIG. 1 is a simplified block diagram of an example computing device.

FIG. 1 is a simplified block diagram of an example computing device 100. Computing device 100 may perform various acts and/or functions, such as those described in this disclosure (including the accompanying drawings). Computing device 100 may include various components, such as processor 102, data storage unit 104, communication interface 106, and/or user interface 108. These components may be connected to each other (or to another device, system, or other entity) via connection mechanism 110.

As used in this disclosure, the term connection mechanism means a mechanism that facilitates communication between two or more devices, systems, or other entities. A communication mechanism may be a relatively simple mechanism, such as a cable or system bus, or a relatively complex mechanism, such as a packet-based communication network (e.g., the Internet). In some instances, a connection mechanism may include a non-tangible medium (e.g., where the connection is wireless).

Processor 102 may include a general-purpose processor (e.g., a microprocessor) and/or a special-purpose processor (e.g., a digital signal processor (DSP)).

Data storage unit 104 may include one or more volatile, non-volatile, removable, and/or non-removable storage components, such as magnetic, optical, or flash storage, and/or may be integrated in whole or in part with processor 102. Further, data storage unit 104 may take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 may be configured to perform one or more acts and/or functions, such as those described in this disclosure. Such program instructions may define and/or be part of a discrete software application that can be executed in response to certain inputs being received from communication interface 106 and/or user interface 108, for instance. Data storage unit 104 may also store other types of data, such as those types described in this disclosure.

Communication interface 106 may allow computing device 100 to connect to and/or communicate with a device, system, or other entity according to one or more protocols. In one example, communication interface 106 may be a wired interface, such as an Ethernet interface or a high-definition serial-digital-interface (HD-SDI). In another example, communication interface 106 may be a wireless interface, such as a cellular or WI-FI interface. Each connection described in this disclosure may be a direct connection or an indirect connection, the latter being a connection that passes through and/or traverses one or more devices, systems, or other entities, such as such as a router, switcher, or other network device.

User interface 108 may facilitate interaction with a user of computing device 100, if applicable. As such, user interface 108 may include input components such as a keyboard, a keypad, a mouse, a touch-sensitive panel, a microphone, and/or a camera, and/or output components such as a display device (which, for example, may be combined with a touch-sensitive panel), a sound speaker, and/or a haptic feedback system.

Computing device 100 may take various forms, such as a workstation, a desktop computer, a laptop, a tablet, and/or a mobile phone.

Figure 2:
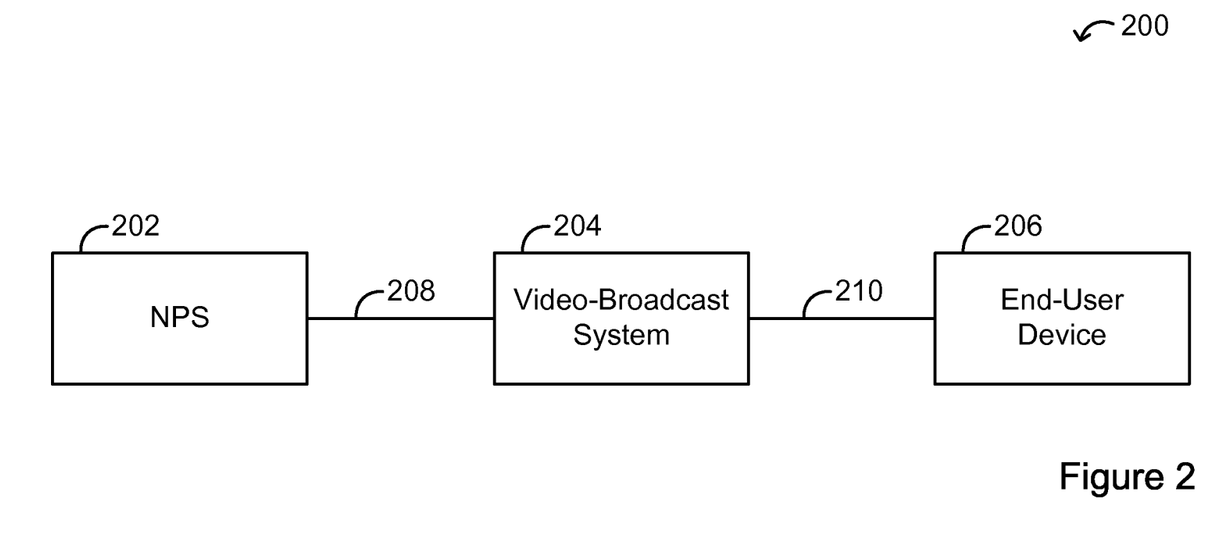
FIG. 2 is a simplified block diagram of an example system.

FIG. 2 is a simplified block diagram of an example system 200. System 200 may include various components, such as news production system (NPS) 202, video-broadcast system 204, and end-user device 206, each of which may be implemented as a computing device or a system that includes one or more computing devices. System 200 may also include connection mechanism 208, which connects NPS 202 with video-broadcast system 204; and connection mechanism 210, which connects video-broadcast system 204 with end-user device 206.

NPS 202 may generate a video stream representing a news program, and may then transmit the video stream to video-broadcast system 204. Video-broadcast system 204 may then receive the video stream and transmit the video stream to end-user device 206 for presentation of the represented video content to an end-user. In practice, video-broadcast system 204 may transmit the video stream to a large number of end-user devices for presentation of the represented video content to a large number of end-users.

A video stream may be transmitted according to a variety of different standards. For instance, a video stream may be transmitted according to the high-definition serial digital interface (HD-SDI) with a data transfer rate of 1.485 Gbps. In some instances, a video stream may be encoded and the encoded version of the video stream may be transmitted instead of the original video stream.

Figure 3:
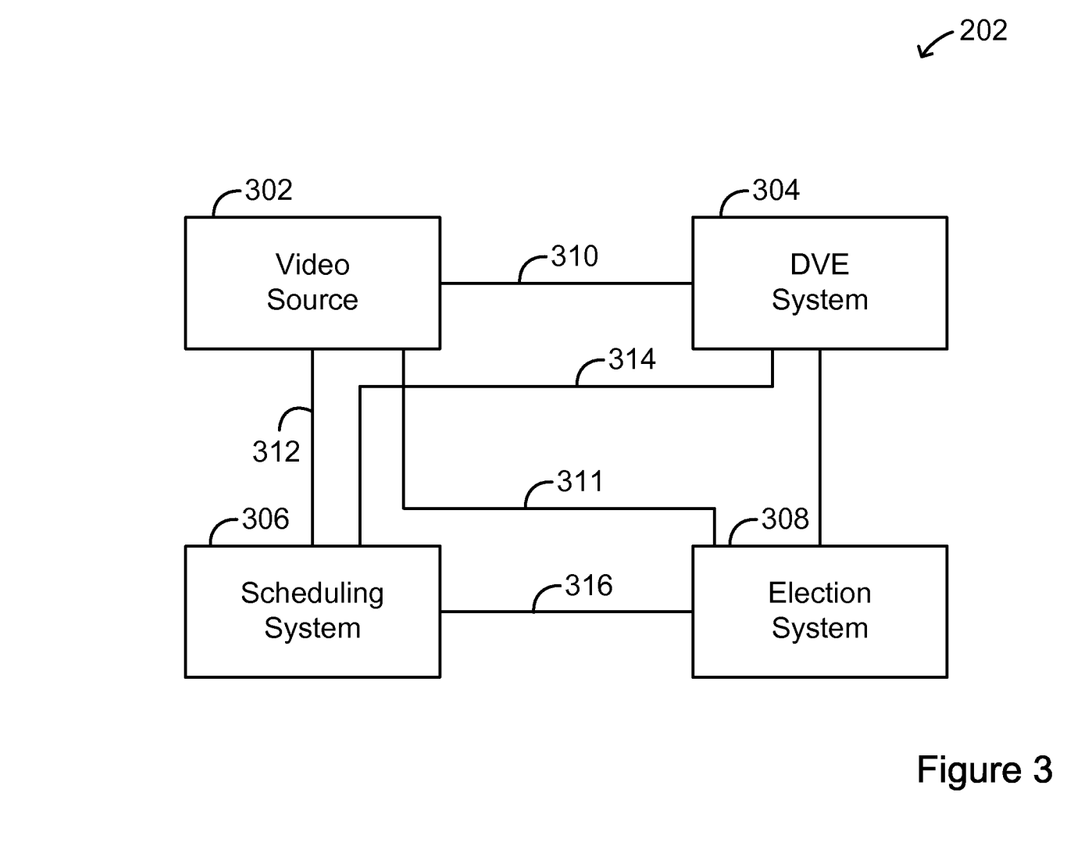
FIG. 3 is a simplified block diagram of another example system.

FIG. 3 is a simplified block diagram of an example NPS 202. NPS 202 may include various components, such as video source 302, DVE system 304, scheduling system 306, and election system 308, each of which may be implemented as computing device or a system that includes one or more computing devices. NPS 202 may also include connection mechanism 310, which connects video source 302 with DVE system 304; connection mechanism 311, which connects video source 302 to election system 308; connection mechanism 312, which connects scheduling system 306 with video source 302; connection mechanism 314, which connects scheduling system 306 with DVE system 304; and connection mechanism 316, which connects scheduling system 306 with election system 308.

Video source 302 may generate and/or output a video stream, and may transmit the video stream to DVE system 304. Video source 302 may take various forms, such as a video camera, a satellite receiver, a video server, or a character generator. An example video server is the K2 server provided by Grass Valley™ of San Francisco, Calif.

A character generator may generate a video stream based on input data. For example, a character generator may use a set of content items and a content template to generate a video stream representing video content that includes the content items positioned based on the template. An example character generator is the Viz Trio provided by Viz Rt™ of Bergen Norway.

A content item may include various types of content, such as text and/or an image. For example, a content item may include text indicating a name of a candidate, text indicating a political party of a candidate, text indicating an amount of votes tabulated for a candidate, or text indicating "yes" or "no." As additional examples, a content item may include a photograph of a candidate, a photograph of a checked or unchecked (perhaps marked with an "x") checkbox to indicate whether a candidate has been declared a winner. Still further, a content item may be a background color or other color setting. This may allow, for instance, data associated with a Democratic party candidate to be shown on a blue background, or may allow data associated with a Republican party candidate to be shown on a red background. Similarly, text indicating "yes" may be shown on a green background, or text indicating "no" may be shown on a red background. In other examples, the text may be outlined with a colored border, or the text itself may be a particular color. Such colors may be indicated, for instance, as a six-digit hex value in standard RGB format.

A content template may include, arranged in a particular position, a content item and/or a content placeholder that corresponds to a content storage-location, in which a content item may be stored. When generating a video stream representing video content, the character generator may replace the content placeholder with the content item stored in the corresponding content storage-location. In the case where a reference is stored in the content storage-location, the character generator may use the reference as a basis to determine (e.g., using a mapping table) what content item to store in the content storage-location.

Figure 4:
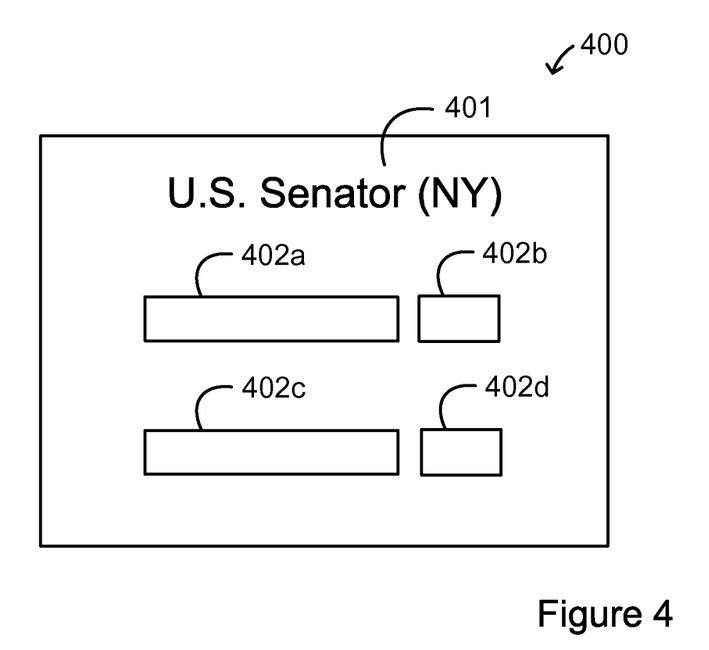
FIG. 4 is a simplified illustration of an example content template.

FIG. 4 helps illustrate the concept of a content template. FIG. 4 is a simplified illustration of a content template 400. Template 400 includes content 401, and content placeholders 402a-d. It should be noted that template 400 has been greatly simplified for the purposes of illustrating certain features. In practice, a template is likely to include more content items and/or content placeholders.

Figure 5A:
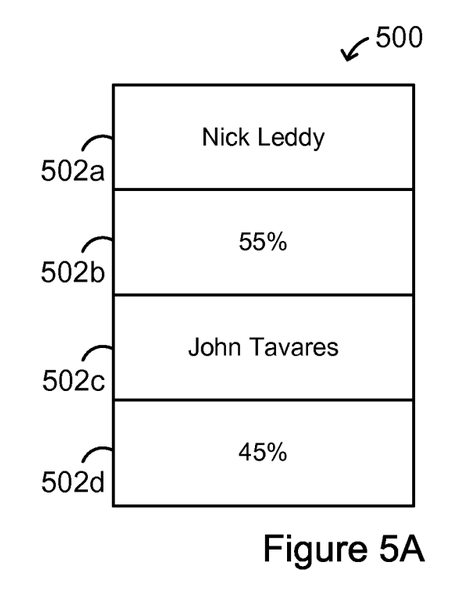
FIG. 5A is a simplified block diagram of a set of content storage-locations, in a first state.
Figure 5B:
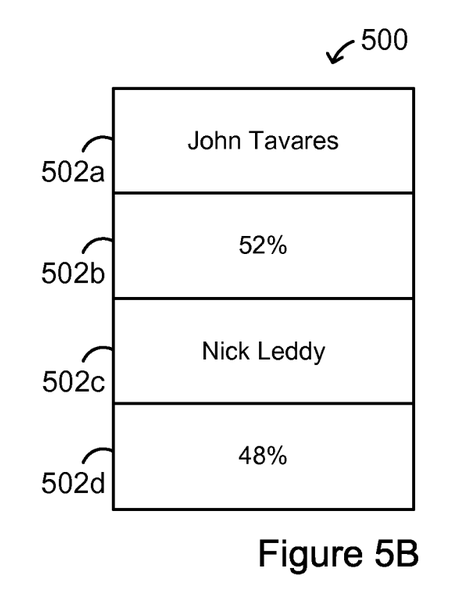
FIG. 5B is a simplified block diagram of the set of content storage-locations of FIG. 4B, but in a second state.

FIGS. 5A and 5B helps illustrate the concept of a content-storage location that corresponds to a content placeholder of a content template. FIG. 5A is a simplified illustration of a set 500 of content storage-locations 502a-d, in a first state. Storage-location 502a corresponds with content placeholder 402a; storage-location 502b corresponds with content placeholder 402b; storage-location 502c corresponds with content placeholder 402c; and storage-location 502d corresponds with content placeholder 402d. FIG. 5B is a simplified illustration of the set 500 of content storage-locations 502a-d, in a second state. As shown, the data stored in the content storage-locations 502a-d changes from the first state to the second state.

Figure 6A:
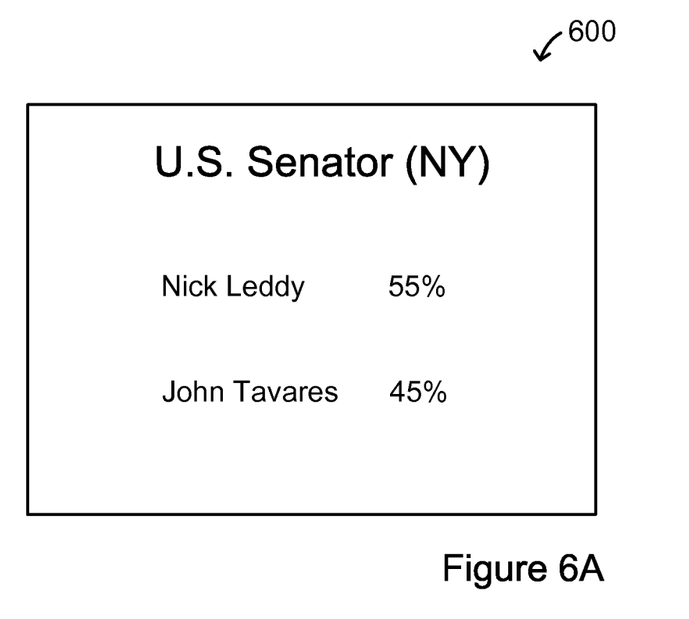
FIG. 6A is a simplified illustration of a frame of an example video segment.
Figure 6B:
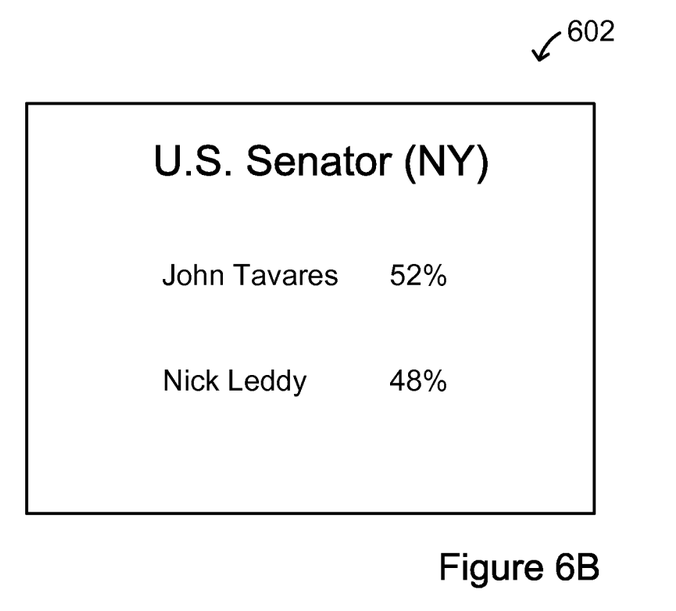
FIG. 6B is a simplified illustration of another frame of the example video segment of FIG. 6A.

FIG. 6A helps illustrate a frame of video content generated based on a content template and a corresponding content storage-location. FIG. 6A is a simplified illustration of a frame 600 generated based on template 400 and corresponding content storage-locations 502a-d, in the first state. FIG. 6B is a simplified illustration of a frame 602 generated based on template 400 and corresponding content storage-locations 502a-d, in the second state. As shown, based on the changed state of the content storage-locations 502a-d, the arrangement of select content items changes from frame 600 to frame 602.

DVE system 304 may execute a DVE, which may cause DVE system 304 to generate and/or output a video stream. DVE system 304 may then transmit the generated video stream to another device, system, or entity, such as video-broadcast system 204.

In one example, DVE system 304 may receive from video source 302, a video stream representing a video segment, and may execute a DVE, which causes DVE system 304 to modify the video segment and to generate and output a new video stream representing the modified video segment.

DVE system 304 may modify the video segment in various ways, such as by overlaying text, images, video, or other content thereon. For example, DVE system 304 may modify the video segment by overlaying a channel logo in a lower right-hand corner of the video segment. As another example, DVE system 304 may modify the video segment by overlaying a text box including text over a lower-third portion of the video segment.

Figure 7A:
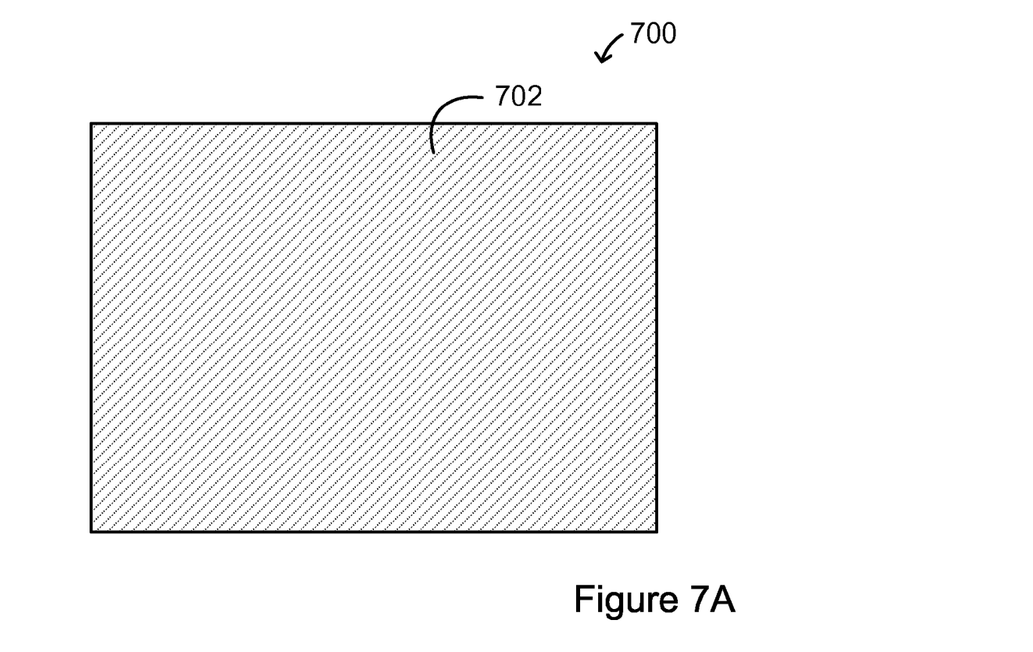
FIG. 7A is a simplified illustration of a frame of an example video segment, where no content is overlaid on the frame.
Figure 7B:
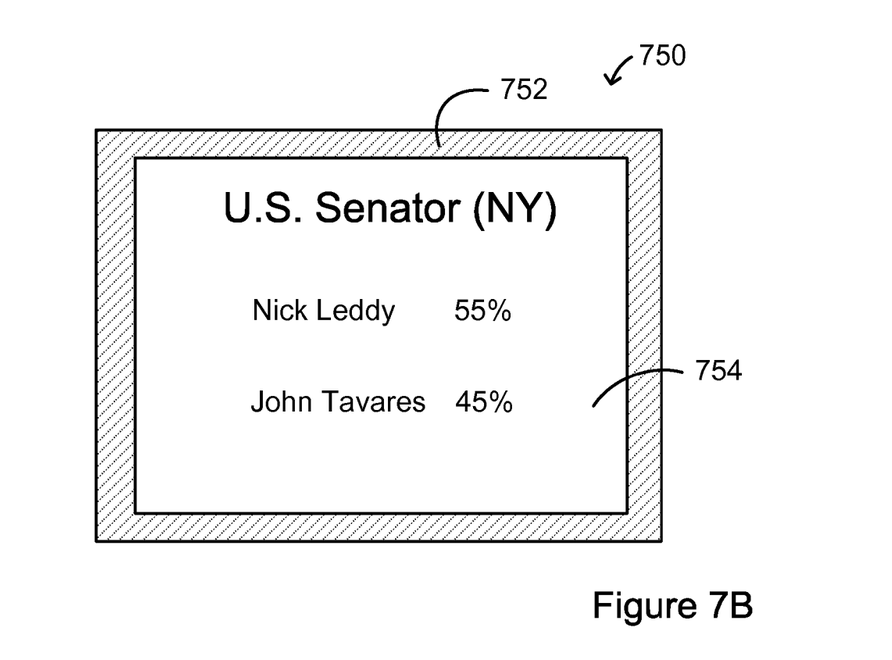
FIG. 7B is a simplified illustration of a frame of an example video segment, where content is overlaid on the frame.

FIGS. 7A and 7B help illustrate the concept of overlaying content. FIG. 7A is a simplified illustration of a frame 700 of an example video segment. Frame 700 includes content 702, but does not include content overlaid on content 702. For comparison, FIG. 7B is a simplified illustration of a frame 750 of an example video segment. Frame 752 includes content 752 and content 754 overlaid on content 752.

As noted above, DVE system 304 may execute a DVE, which causes DVE system 304 to generate a video stream by modifying a video segment represented by an existing video stream. However, as another example, DVE system 304 may execute a DVE, which causes DVE system 304 to generate a video stream without using an existing video stream. In this case, rather than overlaying content on an existing video segment, DVE system 304 may instead generate a new video segment, and may generate a video stream representing the generated video segment.

DVE system 304 may obtain content for use in connection with executing a DVE in various ways. For example, DVE system 304 may retrieve such content from a data storage unit in the DVE system. As another example, DVE system 304 may receive such content from another source, such as video source 302 or election system 308.

In practice, DVE system 304 may execute multiple DVEs in serial fashion. Further, in practice, NPS 202 may include multiple video sources and/or multiple DVE systems. For example, in one arrangement, each of multiple video sources may be connected to DVE system 304, and DVE system 304 may switch between one or more inputs as appropriate to execute a given DVE.

DVE system 304 may also perform other acts/or functions related to DVEs. For example, DVE system 304 may provide a user interface that allows a user to create and/or edit DVEs. When DVE system 304 creates a DVE, DVE system 304 may generate and store corresponding program instructions for later retrieval and execution. As such, the process of the DVE system 304 executing a DVE may involve DVE system retrieving and executing program instructions corresponding to the DVE.

DVE system 304 may take various forms, such as a production switcher. An example production switcher is the Vision Octane production switcher provided by Ross Video Ltd. of Iroquois, Ontario in Canada.

Scheduling system 306 may perform acts and/or functions related to scheduling and managing the production of a news program. For example, scheduling system 306 may provide a user interface that allows a user to create and/or edit a program schedule of a news program. Further, scheduling system 306 may process records in a program schedule. This may result in scheduling system 306 controlling one or more other devices, systems, or entities of the NPS 202 to cause NPS 202 to generate and/or output a video stream representing a news program. As such, based on a program schedule, scheduling system 306 may control video source 302 and DVE system 304.

A program schedule (sometimes referred to in the industry as a "rundown") serves as an outline of a news program and may include multiple records. A news program may be conceptually divided into multiple logically-separated portions (sometimes referred to in the industry as "stories"). As such, each portion of the news program may be represented by a separate record of the program schedule. Each record may include various types of information.

Election system 308 may facilitate the process of gathering, organizing, and outputting election-related data. Such data may come from various sources, such as from government-operated reporting systems, and may take various forms. Such data may indicate various types of information about elections, such as titles of political offices that are the subject of the elections, names and other information of candidates, amounts of votes cast and/or tabulated for candidates, amounts and identifies of precincts or other zones reporting tabulated votes, and/or projections of election outcomes.

In this disclosure, the terms "election" means any type of vote-based decision-making process. In one example, an election may involve a process where voters vote to determine which candidate obtains a political office. In another example, an election may involve a ballot-initiative process where voters vote to determine whether or not a proposed law becomes law. As such, an election may have various types of voting options.

Video-broadcast system 204 may distribute a video stream to an end-user device for presentation of video content represented by the video stream to an end-user. In practice, video-broadcast system 204 may distribute a video stream to a mass number of end-user devices for presentation of video content represented by the video stream to a mass number of end-users. Video-broadcast system 204 may include various systems or components, such as a terrestrial antenna or a satellite, and may be configured for distributing the video stream to end-user device 206 in various ways. For example, video-broadcast system 204 may distribute the video stream over-the-air or via a packet-based network such as the Internet.

End-user device 206 may present video content represented by a received video stream to an end-user. End-user device 26 may take a variety of forms, such as a television, a television set-top box, and/or a computing device. As used throughout this disclosure, the term video-broadcast means the distribution of video via any means.

In some examples, in addition to generating and outputting a video stream representing video content, NPS 202 may generate and output an audio stream representing corresponding audio content. Similarly, in some examples, a video-broadcast system may be integrated with an audio-broadcast system, such that a video stream representing video content may be broadcast together with an audio stream representing corresponding audio content. Likewise, in some examples, in addition to presenting video content represented by a video stream, end-user device 206 may present corresponding audio content represented by a received audio stream. In any of these examples, a video stream and an audio stream may be combined into a single media stream.

III. Example Operations

In one aspect, election system 308 may perform various acts, which will now be described. First, election system 308 may access data associated with an election, and may use the accessed data to determine a status associated with a voting option of the election. In one example, the election may be an election for a political office, and the voting option may be a candidate for the political office. Further, in one example, the status may be a ranking of the voting option based, at least in part, on a comparison between an amount of votes tabulated for the voting option and an amount of voted tabulated for another voting option of the election.

Next, election system 308 may use the determined status as a basis to select a content storage-location from among multiple content storage-locations, where each of the multiple content storage-locations corresponds with a respective content placeholder of a content template. Election system 308 may then store, in the selected content storage-location, a content item associated with the voting option. Election system 308 may store the content item while the video stream is being generated, thereby causing the video content to be modified in real-time or near real-time. From the perspective of a viewer, this may be more desirable since the content items associated with the leading candidate may be in a more prominent position than the content items associated with the second place candidate. Video source 308 may then use the stored content item (e.g., retrieved via connection mechanism 311) to generate a video stream representing video content that includes the stored content item positioned based on a position of the content placeholder.

In another example, election system 308 may store, in the selected content storage-location, a reference to the content item. In this case, video source 302 may use the reference (e.g., retrieved via connection mechanism 311) to retrieve the content item, and then use the retrieved content item to generate the video stream. In the case where a reference is stored in the content storage-location, video source 308 may use the reference as a basis to determine (e.g., using a mapping table) what content item to store in the content storage-location.

To illustrate this technique, consider content template 400. In the case where a first candidate is leading over a second candidate in an election, election system 308 may store content items associated with the first candidate in content storage-locations 502a-b, and may store content items associated with the second candidate in content storage-locations 502c-d (as shown in FIG. 5A). However, in the case where the second candidate then takes a lead over the first candidate, election system 308 may store content items associated with the second candidate in content storage-locations 502a-b, and may store content items associated with the first candidate in content storage-locations 502c-d (as shown in FIG. 5B). This may allow a character generator to generate a video stream representing video content that is dynamically arranged based on a status associated with an election. In particular, upon the first candidate taking the lead over the second candidate, the generated video stream may change as shown between FIG. 6A and FIG. 6B.

While the example provided above involves two candidates, other examples may involve more candidates (or other voting options). For instance, in the case where an election involves three candidates, election system 308 cause content items associated with the candidates to be rearranged in various ways, as desired.

In another example, where the election involves voters voting "yes" or "no" on a ballot initiative, it may be desired to have the voting option with the most amount of tabulated votes on top. However, in other instances, it may be desired to have the "yes" option on top of the "no" option regardless of the amounts of tabulated votes. To provide for both of these options, a user interface of election system 308 may allow a user to select the desired option, and as a result, election system 308 may apply the appropriate logic to facilitate it.

Figure 8:
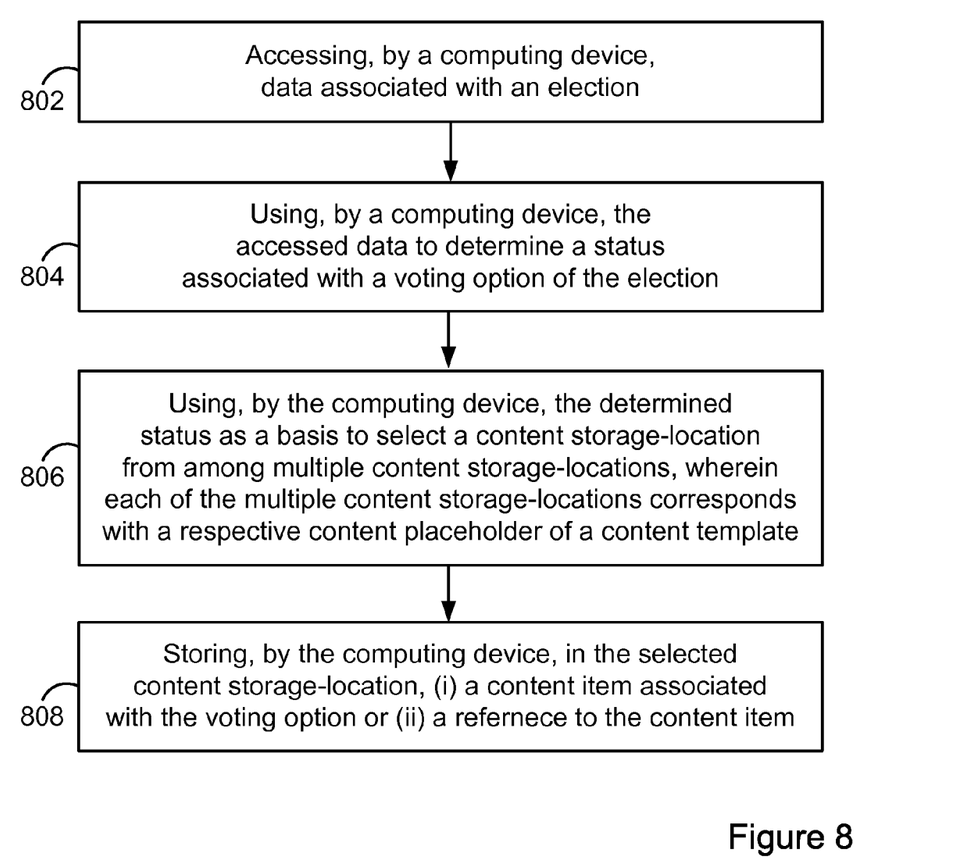
FIG. 8 is a flow chart illustrating an example method.

FIG. 8 is a flow chart illustrating an example method 800. At block 802, method 800 may include accessing, by a computing device, data associated with an election.

At block 804, method 800 may include using, by a computing device, the accessed data to determine a status associated with a voting option of the election.

At block 806, method 800 may include using, by the computing device, the determined status as a basis to select a content storage-location from among multiple content storage-locations, wherein each of the multiple content storage-locations corresponds with a respective content placeholder of a content template.

At block 808, method 800 may include storing, by the computing device, in the selected content storage-location, a content item associated with the voting option or a reference to the content item.

IV. Example Variations

Each of the systems, devices, or other entities described in this disclosure may or may not be a discrete entity. As such, each of the described entities may be made up of multiple discrete entities. Further, two or more of the described entities may be combined into a single discrete entity.

Although some of the acts and/or functions described in this disclosure have been described as being performed by a particular entity (e.g., election system 308), such acts and/or functions may be performed by any entity, such as those described in this disclosure (e.g., video source 302). Further, although the described acts and/or functions have been recited in a particular order, the acts and/or functions need not be performed in the order recited. However, in some instances, it may be desired to perform the acts and/or functions in the order recited. Also, not all of the described acts and/or functions need to be performed to achieve one or more of the benefits provided by this disclosure, and therefore not all acts and/or functions are required.

Although certain variations have been discussed in connection with one or more example of this disclosure, such variations may also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
   accessing, by a computing device at a first time, data associated with an election;
   using, by the computing device, the data accessed at the first time to determine a first status associated with a voting option of the election;
   using, by the computing device, the determined first status as a basis to select a first content storage-location from among multiple content storage-locations, wherein the selected first content storage-location corresponds with a first content placeholder of a content template;
   storing, by the computing device, in the selected first content storage-location, a content item associated with the voting option or a reference to the content item;
   using, by the computing device, the stored content item to generate a video stream representing video content that includes the stored content item positioned based on a position of the first content placeholder;
   accessing, by the computing device at a second time, the data associated with the election;
   using by the computing device, the data accessed at the second time to determine a second status associated with the voting option of the election;
   using, by the computing device, the determined second status as a basis to select a second content storage-location from among the multiple content storage-locations, wherein the selected second content storage-location corresponds with a second content placeholder of the content template that is different from the first content placeholder, storing, by the computing device, in the selected second content storage-location, the content item associated with the voting option or the reference to the content item; and using, by the computing device, the stored content item to generate a modified video stream representing video content that includes the stored content item positioned based on a position of the second content placeholder.

2. The method of claim 1, wherein the status comprises a ranking of the voting option based, at least in part, on a comparison between an amount of votes tabulated for the voting option and an amount of voted tabulated for another voting option of the election.

3. The method of claim 1, wherein the election comprises an election for a political office, and wherein the voting option comprises a candidate for the political office.

4. The method of claim 3, wherein the content item associated with the voting option comprises a photograph of the candidate.

5. The method of claim 3, wherein the content item associated with the voting option comprises text indicating a name of the candidate.

6. The method of claim 3, wherein the content item associated with the voting option comprises text indicating an amount of votes tabulated for the candidate.

7. The method of claim 1, further comprising:
transmitting the video stream to an end-user device for presentation of the video content to an end-user.

8. A non-transitory computer-readable medium having stored thereon, program instructions that when executed by a processor, cause a computing device to perform a set of acts comprising:

accessing, at a first time, data associated with an election;
using the data accessed at the first time to determine a first status associated with a voting option of the election;
using the determined first status as a basis to select a first content storage-location from among multiple content storage-locations, wherein the selected first content storage-location corresponds with a first content placeholder of a content template;
storing, in the first selected content storage-location, a content item associated with the voting option or a reference to the content item;
using the stored content item to generate a video stream representing video content that includes the stored content item positioned based on a position of the first content placeholder;
accessing, at a second time, the data associated with the election;
using the data accessed at the second time to determine a second status associated with the voting option of the election;
using the determined second status as a basis to select a second content storage-location from among the multiple content storage-locations, wherein the selected second content storage-location corresponds with a second content placeholder of the content template that is different from the first content placeholder,
storing, in the selected second content storage-location, the content item associated with the voting option or the reference to the content item; and
using the stored content item to generate a modified video stream representing video content that includes the stored content item positioned based on a position of the second content placeholder.

9. The computer-readable medium of claim 8, wherein the status comprises a ranking of the voting option based, at least in part, on a comparison between an amount of votes tabulated for the voting option and an amount of voted tabulated for another voting option of the election.

10. The computer-readable medium of claim 8, wherein the election comprises an election for a political office, and wherein the voting option comprises a candidate for the political office.

11. The computer-readable medium of claim 10, wherein the content item associated with the voting option comprises a photograph of the candidate.

12. The computer-readable medium of claim 10, wherein the content item associated with the voting option comprises text indicating a name of the candidate.

13. The computer-readable medium of claim 10, wherein the content item associated with the voting option comprises text indicating an amount of votes tabulated for the candidate.

14. A system comprising a data storage unit including multiple content storage-locations, wherein each of the multiple content storage-locations corresponds with a respective content placeholder of a content template, and wherein the system is configured to perform a set of acts comprising:

accessing, at a first time, data associated with an election;
using the data accessed at the first time to determine a status associated with a voting option of the election;
using the determined first status as a basis to select a first content storage-location from among the multiple content storage-locations, wherein the selected first content storage-location corresponds with a first content placeholder of the content template;
storing, in the first selected content storage-location, (i) a content item associated with the voting option, or (ii) a reference to the content item;
using the stored content item to generate a video stream representing video content that includes the stored content item positioned based on a position of the first content placeholder;
accessing, at a second time, the data associated with the election;
using the data accessed at the second time to determine a second status associated with the voting option of the election;
using the determined second status as a basis to select a second content storage-location from among the multiple content storage-locations, wherein the selected second content storage-location corresponds with a second content placeholder of the content template that is different from the first content placeholder,
storing, in the selected second content storage-location, the content item associated with the voting option or the reference to the content item; and
using the stored content item to generate a modified video stream representing video content that includes the stored content item positioned based on a position of the second content placeholder.

15. The system of claim 14, wherein the status comprises a ranking of the voting option based, at least in part, on a comparison between an amount of votes tabulated for the voting option and an amount of voted tabulated for another voting option of the election.

16. The system of claim 14, wherein the election comprises an election for a political office, and wherein the voting option comprises a candidate for the political office.

17. The system of claim 16, wherein the content item associated with the voting option comprises a photograph of the candidate, text indicating a name of the candidate, or text indicating an amount of votes tabulated for the candidate.

18. The system of claim 14, the set of acts further comprising:

transmitting the video stream to an end-user device for presentation of the video content to an end-user.

* * * * *